US 12,037,067 B2

(12) United States Patent
Ziegelmeier et al.

(10) Patent No.: US 12,037,067 B2
(45) Date of Patent: Jul. 16, 2024

(54) MAINTENANCE-FREE SWING ARM SWIVEL AND BEARING DEVICE

(71) Applicant: REINKE MANUFACTURING CO., INC., Deshler, NE (US)

(72) Inventors: Brennan Joos Ziegelmeier, Colby, KS (US); Mark Randall Virus, Hebron, NE (US)

(73) Assignee: Reinke Manufacturing Co., Deshler, NE (US)

( * ) Notice: Subject to any disclaimer, the term of this patent is extended or adjusted under 35 U.S.C. 154(b) by 553 days.

(21) Appl. No.: 17/238,061

(22) Filed: Apr. 22, 2021

(65) Prior Publication Data

US 2021/0237796 A1  Aug. 5, 2021

Related U.S. Application Data

(63) Continuation-in-part of application No. 16/377,651, filed on Apr. 8, 2019, now Pat. No. 11,493,083.

(51) Int. Cl.
*B62D 7/10* (2006.01)
*F16C 17/02* (2006.01)
*A01G 25/09* (2006.01)

(52) U.S. Cl.
CPC ............. *B62D 7/10* (2013.01); *F16C 17/02* (2013.01); *A01G 25/092* (2013.01)

(58) Field of Classification Search
CPC ........ A01D 75/26; B62D 7/10; A01G 25/092; A01G 25/09; A01C 15/001; A01C 21/005; B60G 3/01; B60K 2007/0076
See application file for complete search history.

(56) References Cited

U.S. PATENT DOCUMENTS

| | | | |
|---|---|---|---|
| 3,829,134 A | 8/1974 | Hutchison | |
| 3,838,718 A | 10/1974 | Flory et al. | |
| 4,326,736 A | 4/1982 | Kusumi et al. | |
| 4,449,739 A | 5/1984 | Raether | |
| 6,109,535 A * | 8/2000 | Korus | B05B 15/658 |
| | | | 138/DIG. 6 |
| 6,588,778 B1 | 7/2003 | McLaughlin | |
| 9,301,459 B1 * | 4/2016 | Williams | A01G 25/092 |
| 10,905,056 B2 * | 2/2021 | Dudik | F16L 27/0828 |

(Continued)

OTHER PUBLICATIONS

Notice of Allowance dated Jul. 7, 2022 in U.S. Appl. No. 16/377,651, 5 pages.

(Continued)

*Primary Examiner* — James A English
(74) *Attorney, Agent, or Firm* — Shook, Hardy & Bacon L.L.P.

(57) ABSTRACT

A novel steering tube assembly is provided having a steering tube with a first end and a second end. An upper plate assembly is coupled to the first end of the steering tube and a drive gear plate is coupled to the second end of the steering tube. A bearing steering tube plate is coupled to the steering tube at a location between the first end and the second end. The bearing steering tube plate has a first surface and a second surface. A bearing support is coupled to the first surface of the bearing steering tube plate and includes a cylindrical portion and a flange portion. A bearing block is coupled to the bearing support and the bearing block comprises a low-friction, non-metallic material.

20 Claims, 14 Drawing Sheets

(56) References Cited

U.S. PATENT DOCUMENTS

| | | | |
|---|---|---|---|
| 2002/0125350 A1* | 9/2002 | Buller | A01G 25/09 239/743 |
| 2010/0201120 A1 | 8/2010 | Bolivar et al. | |
| 2011/0153161 A1* | 6/2011 | Grabow | A01G 25/092 701/41 |
| 2012/0010782 A1* | 1/2012 | Grabow | A01G 25/092 701/41 |
| 2012/0228864 A1* | 9/2012 | Kerns | A01G 25/092 285/80 |
| 2014/0124050 A1 | 5/2014 | Tix et al. | |
| 2016/0356403 A1 | 12/2016 | Perrigo et al. | |
| 2017/0009923 A1 | 1/2017 | Chavan | |
| 2018/0016756 A1 | 1/2018 | Beckman et al. | |
| 2020/0315109 A1 | 10/2020 | Rempe et al. | |
| 2021/0059132 A1* | 3/2021 | Korus | A01G 25/092 |

OTHER PUBLICATIONS

Notice of Allowance dated Aug. 9, 2022 in U.S. Appl. No. 16/527,901, 5 pages.

Non-Final Office Action dated Feb. 3, 2022 in U.S. Appl. No. 16/527,901, 14 pages.

Non-Final Office Action dated Feb. 7, 2022 in U.S. Appl. No. 16/377,651, 21 pages.

\* cited by examiner

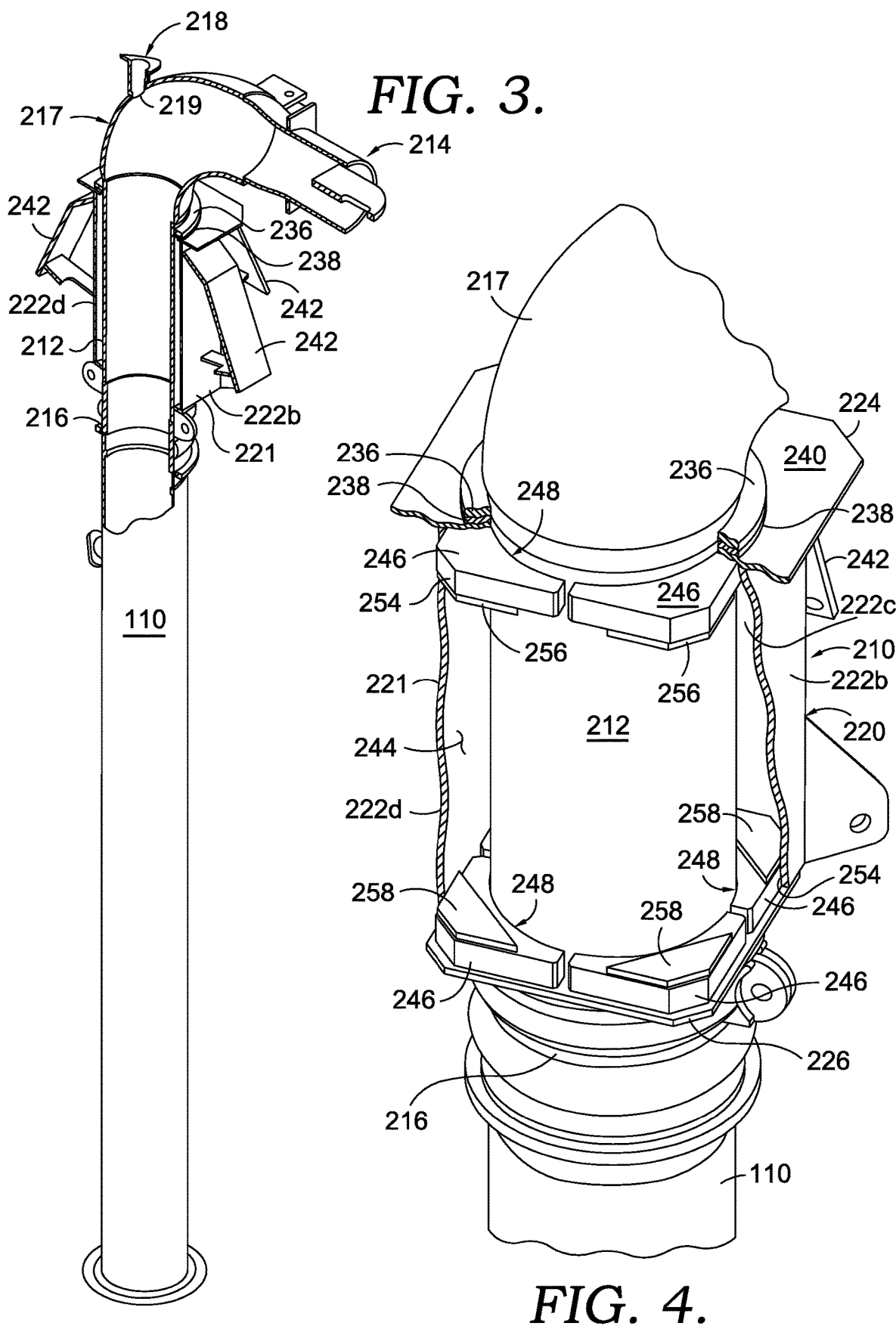

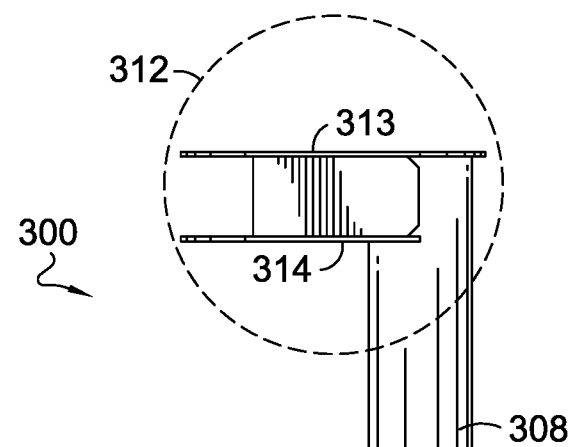
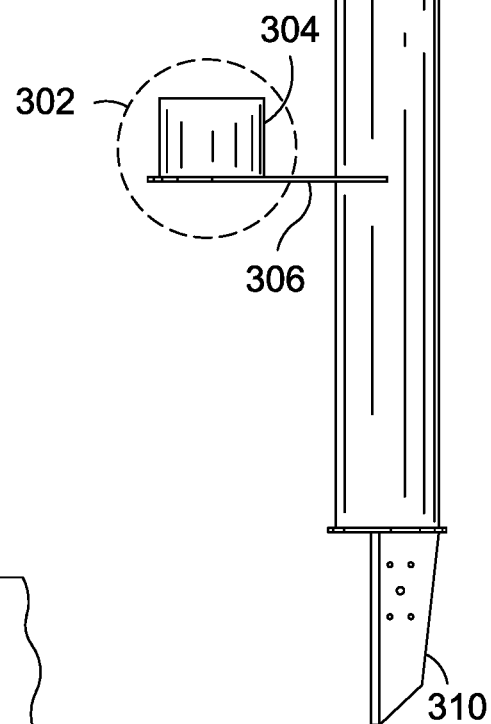
FIG. 12.
PRIOR ART
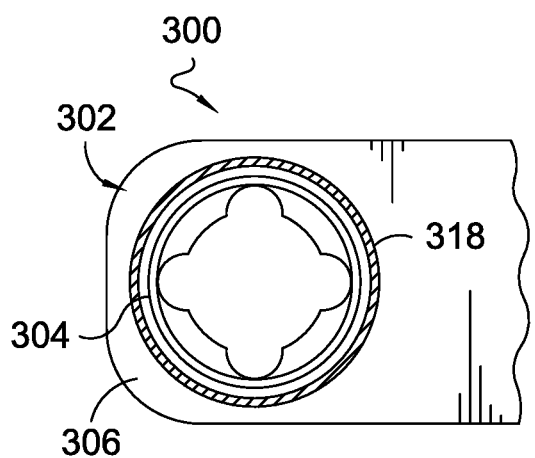
FIG. 13.
PRIOR ART

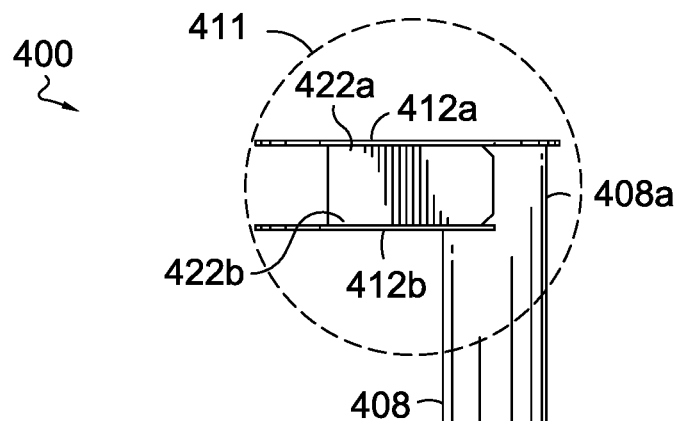
FIG. 16.
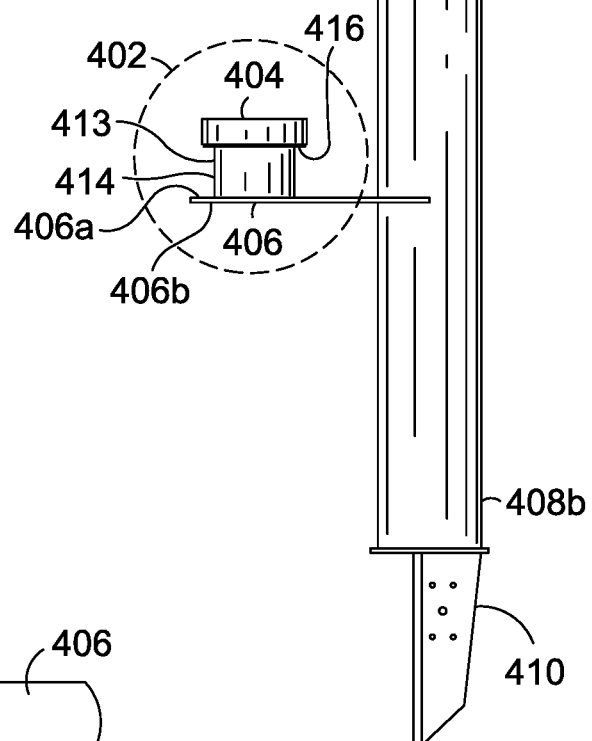
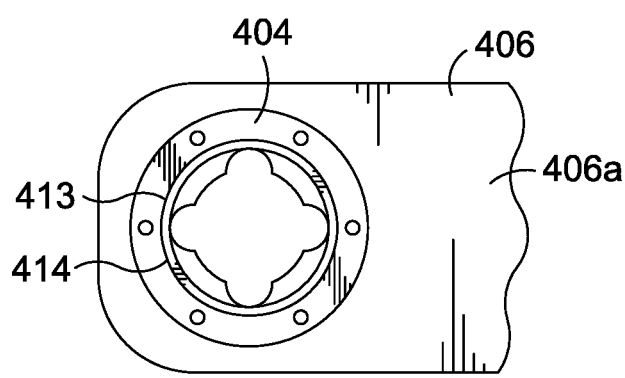
FIG. 17.

MAINTENANCE-FREE SWING ARM SWIVEL AND BEARING DEVICE

CROSS-REFERENCE TO RELATED APPLICATIONS

This application is a continuation-in-part of pending U.S. application Ser. No. 16/377,651, filed Apr. 8, 2019, entitled "GREASELESS SWIVEL AND BEARING DEVICE", the entirety of which is incorporated herein by reference.

TECHNICAL FIELD

The present disclosure relates to a maintenance-free swing arm swivel and bearing device. In particular, the present disclosure relates to a maintenance-free swing arm swivel and bearing device for a center pivot irrigation unit that uses a greaseless bearing and provides a substantially maintenance-free design. The present disclosure further relates to a maintenance-free swing arm swivel and bearing device assembly.

BACKGROUND

The following discussion of the background of the disclosure is intended to facilitate an understanding of the present disclosure. However, it should be appreciated that the discussion is not an acknowledgement or admission that any of the referenced material was published, known, or part of the common general knowledge as of the priority date of the application. Some embodiments of the disclosure are described herein with reference to mechanized irrigation equipment and/or systems. However, it will be understood and appreciated by those having ordinary skill in the art that embodiments of the disclosure are not limited to mechanized irrigation system applications and may be used in other applications having rotating or swiveling mechanical parts.

Mechanized irrigation systems provide the ability to manage water resources and, in some instances, other liquids. For example, mechanized irrigation systems can enable application of an optimal amount of water at critical times during a crop's life cycle, fortifying crop health and maximizing yield potential. While there are many components that make up mechanized irrigation systems, in a general sense, such systems include a mechanical structure, a drivetrain, and a control system. One common type of mechanized irrigation systems is a center pivot arrangement that includes a center point about which the system rotates or swivels. The center point may include a rotational swivel and bearing assembly that supports a span. A "span," as the term is used herein, is a structural assembly comprised of a horizontal irrigation pipeline, struts and braces, and a truss rod connection system. A pivot center swivel and bearing assembly provides a swiveling connection between a vertical water supply column coming out of the ground and the horizontal irrigation pipeline that delivers water to a plurality of sprinklers. An upper portion of a swivel elbow component is coupled with the horizontal irrigation pipeline. A lower portion of the swivel elbow component extends vertically down through a bearing and is coupled to the vertical water supply column. Conventionally, the bearing is a circular tube having an inner diameter slightly larger than the outer diameter of the vertical portion of the swivel elbow component.

The pivot center swivel and bearing assembly supports multiple axial loads from the connecting span (or spans) that are exerted upon the assembly during periods of operation or standing still. Due to the high and/or continual loads, for free and effective rotational movement to occur, it is common to use grease or other similar material to provide the lubrication needed for the span rotation to occur freely. The grease is applied between the water supply column and the bearing during regular maintenance intervals to keep the assembly lubricated. Due to the sustained loads and fluctuations in temperature, this grease can excrete out of the bearing causing damage within the bearing and to adjacent components such as rubber gasket style connections. In general, the excreted grease can also spill onto other components such as meters, sensors, electrical wiring and walking platforms causing a mess in and around the pivot center assembly.

SUMMARY

This Summary is provided to introduce a selection of concepts in a simplified form that are further described below in the Detailed Description. This Summary is not intended to identify key features or essential features of the claimed subject matter, nor is it intended to be used in isolation as an aid in determining the scope of the claimed subject matter.

Aspects of the disclosure are generally directed to a steering tube assembly comprising a steering tube having a first end, a second end, and an upper plate assembly coupled to the first end of the steering tube. Further, the steering tube assembly comprises a drive gear plate coupled to the second end of the steering tube, and the steering tube assembly further comprises a bearing steering tube plate coupled to the steering tube at a location between the first end and the second end of the steering tube, the bearing steering tube plate having a first surface and a second surface. A bearing support is additionally coupled to the first surface of the bearing steering tube plate, wherein the bearing support comprises a cylindrical portion and a flange portion having a diameter, and a bearing block is coupled to the bearing support, wherein the bearing block comprises a low-friction, non-metallic material.

Further aspects of the disclosure are additionally directed to a bearing block assembly, comprising a bearing steering tube plate having a first surface and an opposing second surface, and a bearing support coupled to the first surface of the bearing steering tube plate. The bearing support further comprises a cylindrical portion having an internal diameter and an outer diameter, and a flange portion coupled to the cylindrical portion of the bearing support, the flange portion having an internal diameter equal to the outer diameter of the cylindrical portion. In other aspects, the bearing support further comprises an outer diameter larger than the internal diameter of the flange portion, and a thickness. The bearing block has an internal diameter nearly equal to the outer diameter of the cylindrical portion, wherein the bearing block comprises a low-friction, non-metallic material.

Additionally, aspects of the disclosure are directed to a swivel and bearing assembly comprising an outer housing having a sidewall having a top portion and a bottom portion. The swivel and bearing assembly further comprises a top plate coupled with the top portion of the sidewall, the top plate having a first opening therein, and a bottom plate coupled with the bottom portion of the sidewall, the bottom plate having a second opening therein, wherein an interior surface of the sidewall, an interior surface of the top plate and an interior surface of the bottom plate cooperate to define an interior volume. Further, the swivel and bearing assembly comprises a steering tube having a first end a second end, an upper plate assembly coupled to the first end of the steering tube, and a drive gear plate coupled to the second end of the steering tube. Finally, the swivel and bearing assembly comprises a bearing steering tube plate coupled to the steering tube at a location between the first end and the second end of the steering tube, the bearing steering tube plate having a first surface and a second surface, a bearing support coupled to the first surface of the bearing steering tube plate, wherein the bearing support comprises a cylindrical portion and a flange portion having a diameter, and a bearing block coupled to the bearing support, wherein the bearing block comprises a low-friction, non-metallic material, a first plurality of bushing members positioned within the interior volume, adjacent the top plate, and circumferentially about the first opening, and a second plurality of bushing members positioned within the interior volume, adjacent the bottom plate, and circumferentially about the second opening.

BRIEF DESCRIPTION OF THE DRAWINGS

Aspects of the disclosure are described in detail below with reference to the attached drawing figures, wherein:

FIG. 3 is a fragmentary, perspective view of the greaseless swivel and bearing assembly of FIG. 2, with a portion thereof shown in cross-section;

FIG. 4 is an enlarged, fragmentary, perspective view of the greaseless swivel and bearing assembly of FIG. 2, with portions of the assembly cut away for clarity;

FIG. 12 is a fragmentary side elevation view of the prior art swing arm swivel and bearing device of FIG. 11 with portions thereof removed for clarity;

FIG. 13 is a fragmentary top plan view of the prior art swing arm swivel and bearing device of FIG. 11 taken along the line 13-13 therein;

FIG. 16 is a fragmentary side elevation view of the novel steering tube assembly of FIG. 15 with portions thereof removed for clarity;

FIG. 17 is a fragmentary top plan view of the novel steering tube assembly of FIG. 15 taken along the line 17-17 therein.

DETAILED DESCRIPTION

Figure 1:
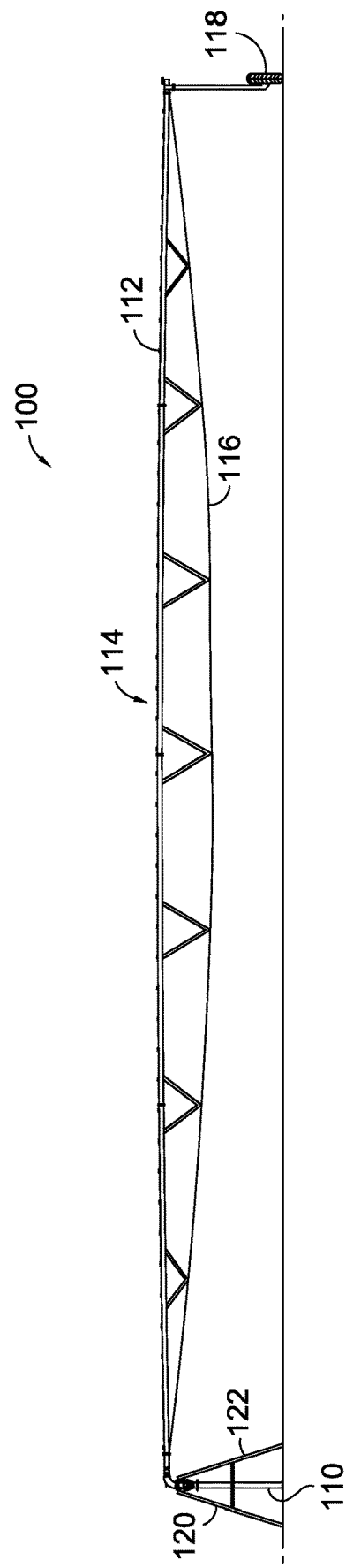
FIG. 1 is a schematic diagram depicting a side elevation view of a section of an exemplary mechanized irrigation system of the center pivot type suitable for implementing aspects of the disclosure.
Figure 2:
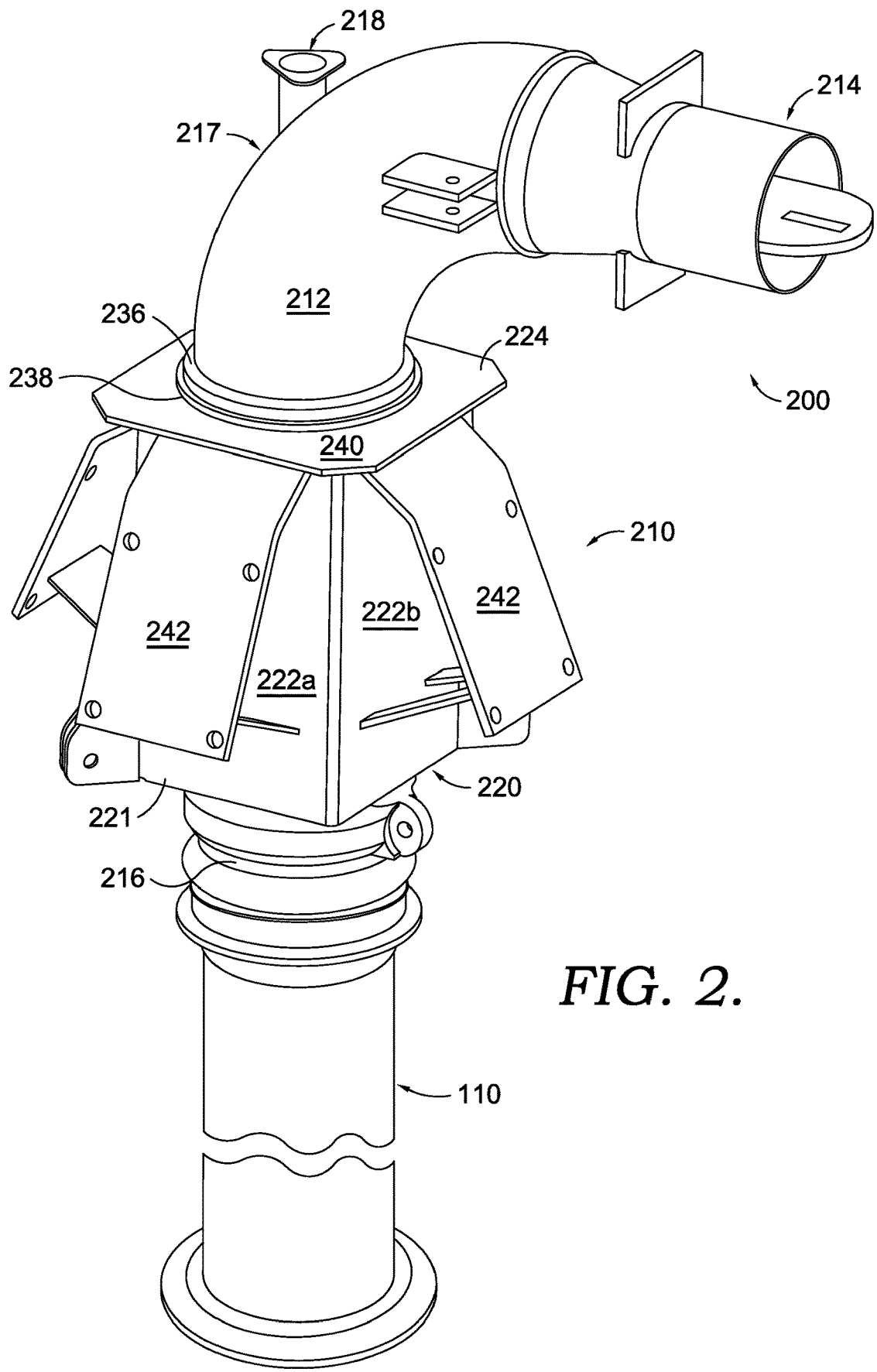
FIG. 2 is a fragmentary, perspective view of an exemplary greaseless swivel and bearing assembly, in accordance with aspects of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different components, steps, or combinations of components and/or steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present disclosure provide a pivot center swivel and bearing device that permits adequate rotation of a coupled cylindrical tube without the need for grease or other lubricant that can damage portions of the device, cause a mess, and necessitate regular maintenance. In embodiments, the greaseless pivot center swivel and bearing device includes an outer housing having a sidewall, a top plate, a bottom plate, and a plurality of bushing members. The sidewall of the outer housing includes a top portion and a bottom portion. The top plate is coupled with the top portion of the sidewall and the bottom plate is coupled with the bottom portion of the sidewall. Each of the top and bottom plates includes an opening therein. The sidewall includes at least one wall that, in cooperation with the top plate and the bottom plate, defines an interior volume. In an exemplary embodiment, the sidewall of the outer housing includes four walls that cooperate to form a structure having a generally rectangular cross-section. In an exemplary embodiment, the outer housing has a cross-section that is generally square. It will be understood and appreciated by those having ordinary skill in the art however, that embodiments of the disclosure contemplate housings having cross-sections of any geometric shape.

Each of the plurality of bushing members is formed of a low-friction material and is positioned (e.g., removably positioned) within the interior volume. In some embodiments, the bushing members are positioned in receptacles sized and shaped for receipt thereof. In embodiments where the outer housing has a generally rectangular cross-section, the receptacles may be positioned at or near corners of the outer housing defined by two of the walls. In embodiments, the bushing members include a surface cylindrically curved about a central, longitudinal axis extending between the top and bottom portions of the sidewall. The cylindrically curved surfaces, in cooperation with the openings in the top and bottom plates, define a cylindrical passage through the interior volume sized and shaped for receiving a cylindrical tube, for instance, a lower portion of a swivel elbow component configured for connecting with a vertical water supply column of a mechanized irrigation system.

In operation, the cylindrically curved surfaces of the bushing members contact a tube received within the cylindrical passage. Due to the material from which the bushing members are formed (e.g., a low-friction material), such positioning permits rotation of the tube within the passage without the need for grease or other lubrication.

Embodiments of the present disclosure may be utilized in connection with irrigation systems. As used in this application, the term "irrigation system" refers to any type of mechanized irrigation equipment. Exemplary types of mechanized irrigation equipment and systems include, but are not limited to, center pivot, lateral move, and combinations thereof. A center pivot irrigation system comprises a horizontal irrigation pipeline connected to a vertical water supply column at a pivot point. Towers with motorized wheels are located along the length of the horizontal irrigation pipeline. Trusses may be used to support the pipeline between the towers. Cables may run along the pipeline or trusses to provide electricity to the motors that move the wheels on the towers and to various electrical components. The center pivot irrigation system moves in an arc centered at the pivot point. Sprinklers that distribute water to crops as the irrigation system moves around the arc are arranged along the irrigation pipeline.

Turning now to FIG. 1, a schematic view in side elevation of a section of an exemplary mechanized irrigation system 100 of the center pivot type suitable for use with the greaseless swivel and bearing device and assembly of the present disclosure is shown. As mentioned, aspects of the disclosure are not limited to use on center pivot irrigation systems. The mechanized irrigation system 100 extends from a vertical water supply column 110 configured for accessing water from a water resource, such as a well. In one aspect, the vertical water supply column 110 is of a suitable structural material such as galvanized steel, aluminum, or the like. One or more pumps (not shown) associated with the mechanized irrigation system 100 supply water to a horizontal irrigation pipeline 112, which runs the length of the irrigation system 100.

The mechanized irrigation system 100 comprises a span 114. The span 114 includes the substantially horizontal irrigation pipeline 112 that is supported by a truss 116 and extends between the vertical water supply column 110 and a motorized tower 118. In one aspect, the irrigation pipeline 112 is formed from a suitable structural material such as galvanized steel, aluminum, or the like. Sprinklers (not shown) may be positioned along the irrigation pipeline 112. Sprinklers used with the exemplary irrigation system 100 may include, by way of example only, impact sprinklers, rotator style sprinklers, and drip lines. A cable (not shown) runs the length of the irrigation pipeline 112 and provides power, and possibly control and communications, to the motorized tower 118 and other electrical components positioned along the span 114. A center pivot tower 120 having a plurality of legs 122 supports the vertical water supply column 110 and prevents lateral movement thereof.

To couple the vertical water supply column 110 with the substantially horizontal irrigation pipeline 112, embodiments of the disclosure contemplate use of a greaseless swivel and bearing device. With reference to FIGS. 2-7, an exemplary greaseless swivel and bearing assembly 200 having a greaseless swivel and bearing device 210 coupled with a cylindrical inner tube 212 having a circular cross-section is shown. It will be understood and appreciated by those having ordinary skill in the art that inner tubes having cross-sections other than circular may be utilized within the scope of embodiments hereof. Inner tubes having cross-sections of any geometric shape are contemplated.

The inner tube 212 includes a first end 214 configured for connecting, for instance, to the substantially horizontal irrigation pipeline 112 of FIG. 1, and a second end 216 configured for connecting, for instance, to the vertical water supply column 110 of FIG. 1. The inner tube 212 further includes a curved portion 217 that provides a radius ninety-degree sweep transitioning the vertical water flow at the second end 216 of the inner tube 212 to the horizontal flow at the first end 214 of the inner tube 212. The illustrated inner tube 212 additionally includes, or is coupled with, a socket 218, also known as a J-pipe coupling, configured to connect, for instance, the electrical conduit from an irrigation system main electrical power distribution framework to a span (e.g., the span 114 of FIG. 1). An opening 219 permits electrical cables (not shown) to enter into the vertical water column in the vertical supply column 110. The cables then travel up into the cylindrical inner tube 212 and out the socket 218. This arrangement allows the span 114 to rotate about the vertical water supply column 110 without tangling the cables.

The illustrated embodiment of the greaseless swivel and bearing device 210 includes an outer housing 220 having a sidewall 221 comprised of a plurality of walls 222a-d, a top plate 224 (also referred to herein as a "first end plate"), and a bottom plate 226 (also referred to herein as a "second end plate). The illustrated assembly 200 includes four substantially identically shaped and sized walls 222a-d configured such that a structure having a generally square cross-section is formed. It will be understood and appreciated by those having ordinary skill in the art that while an outer housing 220 having a square cross-section is illustrated in FIGS. 2-7, an outer housing having a cross-section of any geometric shape is contemplated to be within the scope of embodiments of the present disclosure. An outer housing having a square cross-section as illustrated is easy to manufacture and is capable of providing the structural rigidity required to support and sustain loads applied in irrigation system applications. The square outer dimension of the outer housing 220 additionally provides a support and mounting platform, or surface, for accessories to be attached, or affixed, including other distributive structural members such as, by way of example only, mounting plates 242 for attaching the legs 122 of the center pivot tower 120 (FIG. 1), sensors (e.g., cameras, vibration sensors and load sensors), circular track for switches, and other electronic or electromechanical components. As illustrated, each of the walls 222a-d includes a structural member in the nature of mounting plates 242 attached thereto.

The top plate 224 is connected to the top portion 228 of the sidewall 221 of the outer housing 220. In embodiments, the top plate 224 is configured to prevent environmental contamination to components positioned within the greaseless swivel and bearing device 210 by acting as a cover to the device 210. In a similar fashion, the bottom plate 226 is connected to the bottom portion 230 of the sidewall 221 of the greaseless swivel and bearing device 210. In embodiments, the bottom plate 226 may include one or more openings (not shown) for venting purposes. Each of the top plate 224 and the bottom plate 226 includes an opening therein 232, 234, respectively, that is sized and shaped for receiving the cylindrical inner tube 212.

The illustrated greaseless swivel and bearing device 210 further includes a swivel ring 236 and a swivel washer 238. The swivel ring 236 is a circular ring that is coupled with an exterior surface of a portion of the cylindrical inner tube 212 that is positioned above a top surface 240 of the top plate 224. The swivel ring 236 is affixed to the exterior surface of the cylindrical inner tube 212 so as to set the vertical position of the inner tube 212 within the greaseless swivel and bearing assembly 200. The swivel ring 236 also evenly distributes the load from the vertical axis and provides a mating surface for the swivel washer 238. The swivel washer 238 is positioned just below the swivel ring 236. Though the illustrated embodiment shows a single swivel washer 238, additional swivel washers may be employed within embodiments of the present disclosure based upon clearance requirements. The material of the swivel washer 238 provides a smooth or slick surface enabling rotational movement when vertical axial loads are applied to the assembly 200. The top plate 224 provides a load bearing surface for the swivel washer 238 and adjacent swivel ring 236.

The walls 222a-d, the top plate 224, and the bottom plate 226 cooperate to define an interior volume 244. Positioned within the interior volume 244 is a plurality of bushing members 246. In embodiments, each of the plurality of bushing members 246 is removably positioned within the interior volume 244. Suitable materials for the bushing members 246 include low-friction materials such as plastics and/or composites, for instance, Ultra-High-Molecular-Weight (UHMW) polyethylene.

As best seen in FIG. 4, in embodiments, a first portion of the plurality of bushing members 246 is positioned adjacent the top plate 224 and around or about the opening 232 in the top plate 224 and a second portion of the plurality of bushing members 246 is positioned adjacent the bottom plate 226 and around or about the opening 234 in the bottom plate 226. Each bushing member 246 includes an inwardly facing surface 248 that is cylindrically curved about a central, longitudinal axis 250 extending between the top plate 224 of the outer housing 220 and the bottom plate 226 of the outer housing 220. The opening 232 in the top plate 224, the opening 234 in the bottom plate 226, and the cylindrical surfaces 248 of the bushing members 246 cooperate to form a cylindrical passage 252 through the interior volume 244 that is sized to receive the cylindrical inner tube 212.

In embodiments, a plurality of bushing receptacles 254 is positioned within the interior volume 244, each bushing receptacle 254 sized and shaped for receiving one of the plurality of bushing members 246. As best seen in the embodiment illustrated in FIG. 4, bushing receptacles 254 configured for receiving the first portion of the bushing members 246 (i.e., those bushing members 246 positioned adjacent the top plate 224 and around or about the opening 232 in the top plate 224) are formed by the top plate 224, walls 222a-d of the outer housing 220, and a lower shelf structure 256. Bushing receptacles 254 configured for receiving the second portion of the bushing members 246 (i.e., those bushing members 246 positioned adjacent the bottom plate 226 and around or about the opening 234 in the bottom plate 226) are formed by the bottom plate 226, walls 222a-d of the outer housing 220, and an upper shelf structure 258. It will be understood and appreciated by those having ordinary skill in the art that bushing receptacles 254 may take any number of forms in accordance with embodiments of the present disclosure so long as they are sized and shaped to receive bushing members 246 therein. The illustrated embodiment is exemplary only.

Bushing members 246 may take the form of bushing blocks or slip blocks in accordance with embodiments of the present disclosure. Bushing blocks 246 are objects that are designed to fit within receptacles (e.g., bushing receptacles 254) in the interior volume 244. Such blocks provide a mating or bearing surface to the cylindrical inner tube 212 (i.e., the curved surfaces 248) and are formed from materials that are smooth and slick, thereby providing easy swivel operation for the cylindrical inner tube 212. In such embodiments, once the cylindrical inner tube 212 is positioned within the swivel and bearing device 210, the bushing blocks are unable to be removed or repositioned without dismantling the assembly 200.

Slip blocks are similar to bushing blocks 246 and also are designed to fit within receptacles (e.g., bushing receptacles 254) in the interior volume 244. Slip blocks differ from bushing blocks, however, in that slip blocks are adjustable over time. Slip blocks provide an adjusting rod mechanism that extends outside the outer housing 220. Adjusting the rod moves the slip block in or out of the bushing receptacle providing the ability to fine-tune the bearing surfaces during initial product setup. Once set, this adjustment is not needed and no regular maintenance intervals are required. An alternate design to the adjustable rod mechanism is a self-adjusting spring-style mechanism preventing the need for manual intervention during installation. The spring-style mechanism would continually bias slip blocks toward the central longitudinal axis 250 at the center of the outer housing 220. Any and all such variations, and any combination thereof, are contemplated and are within the scope of embodiments of the present disclosure.

Figure 5:
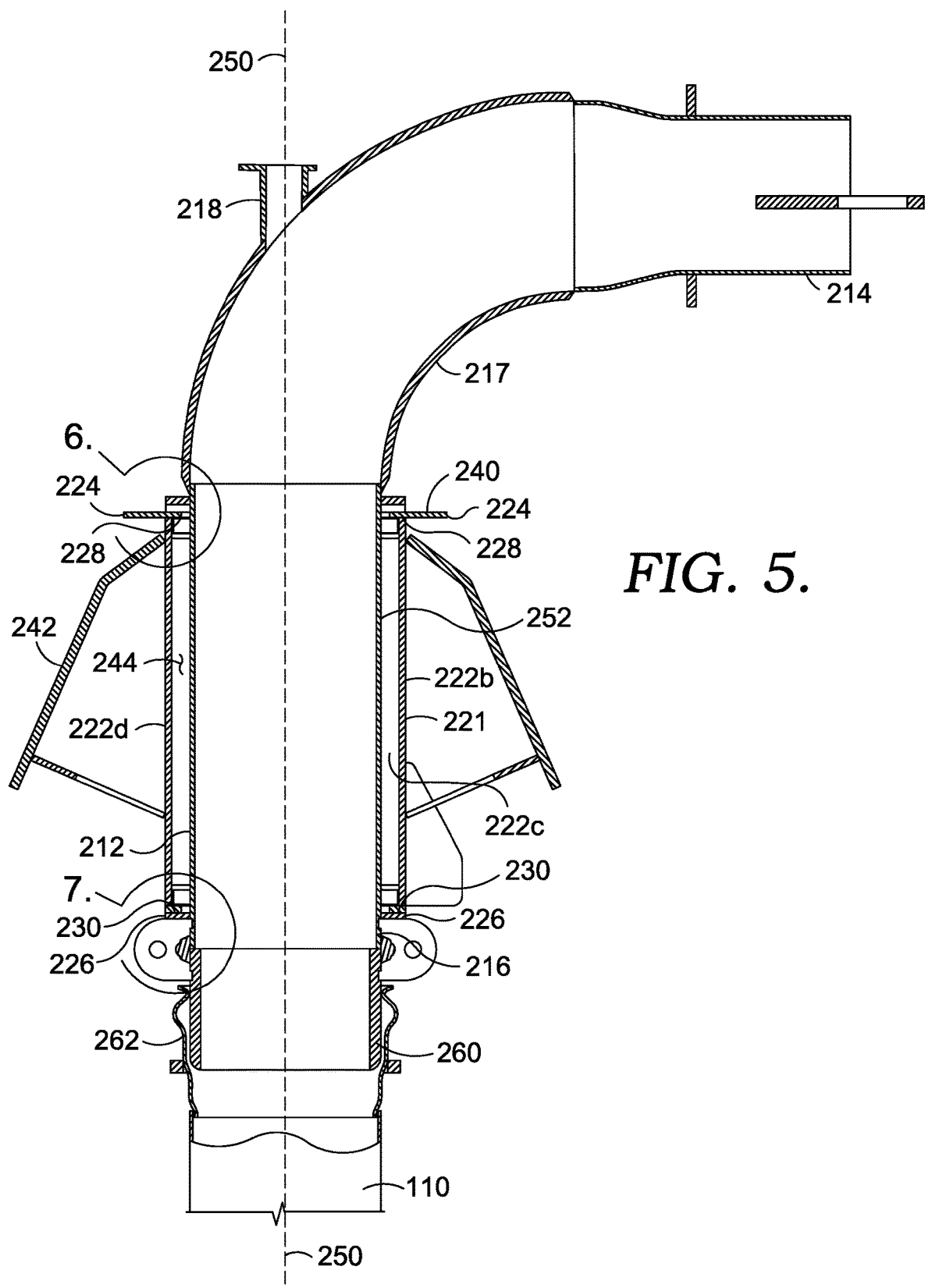
FIG. 5 is a side elevation view in cross-section of the greaseless swivel and bearing assembly of FIG. 2.
Figure 6:
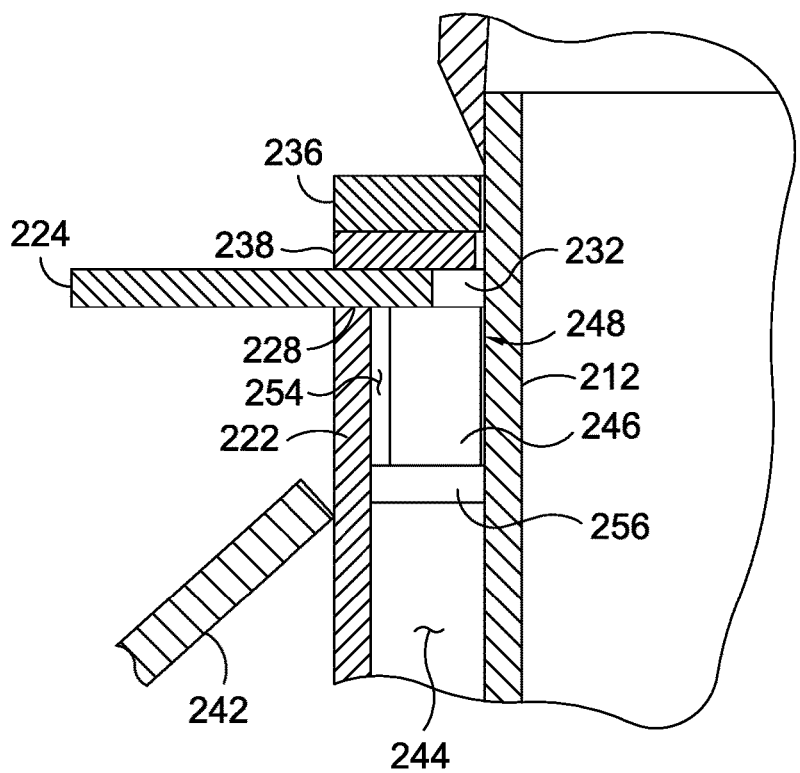
FIG. 6 is an enlarged, fragmentary view in partial cross-section of the greaseless swivel and bearing assembly of FIG. 5, taken at line 6 thereof.

As best illustrated in FIG. 5, the second end 216 of the inner tube 212 is preferably coupled with a replaceable pipe section 260 via a coupler 262. The pipe section 260 is received in a coupler 262 located at an uppermost end of the stationary vertical water supply column 110. Accordingly the pipe section 260 rotates within the stationary coupler 262 as the span 114 rotates about the vertical water supply column 110. While the inner tube 212 could itself extend down into the coupler 262, some wear can be experienced on the portion of the pipe rotating within the coupler 262. Further, because the pipe section 260 is of a short length, higher quality and/or thicker material can be used without having to use the same for the entire length of the inner tube 212. For example, the pipe section 260 and/or the inner tube 212 can be made out of one or a combination of non-corrosive materials.

Figure 7:
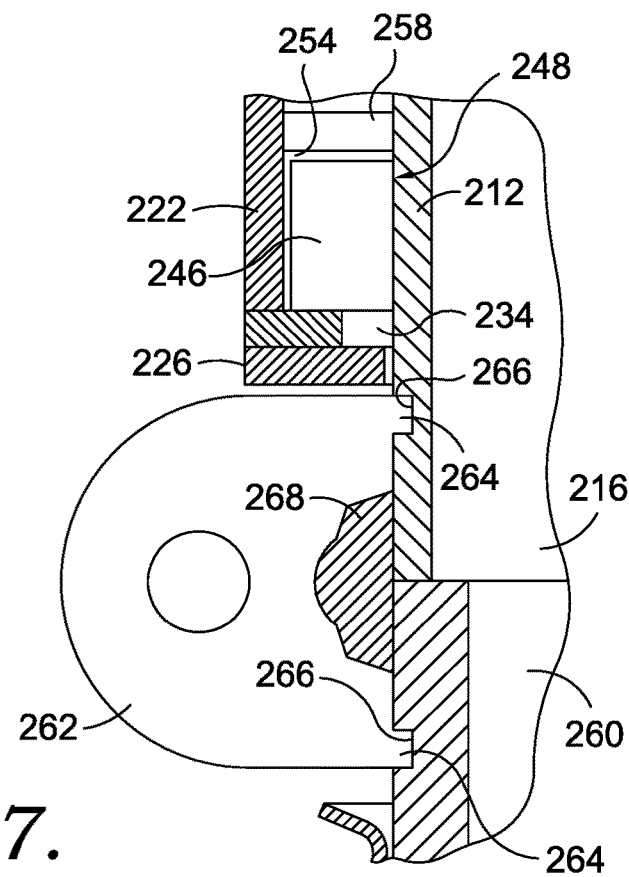
FIG. 7 is an enlarged, fragmentary view in partial cross-section of the greaseless swivel and bearing assembly of FIG. 5, taken at line 7 thereof.

As best illustrated in FIG. 7, a gasket 268 mechanically couples the second end 216 of the inner tube 212 with the coupler 262. The coupler 262 not only prevents lateral movement between the inner tube 212 and the pipe section 260, it also prevents separation between the inner tube 212 and the pipe section 260 along the longitudinal axis. In particular, the coupler 262 includes a pair of ridges 264 adjacent its upper and lower edges that project inwardly. The ridges 264 are received in channels or grooves 266 that circumscribe the outer surface of both the inner tube 212 and the pipe section 260. The gasket 268 makes the connection between the second end 216 of the inner tube 212 and the coupler 262 watertight.

Figure 8:
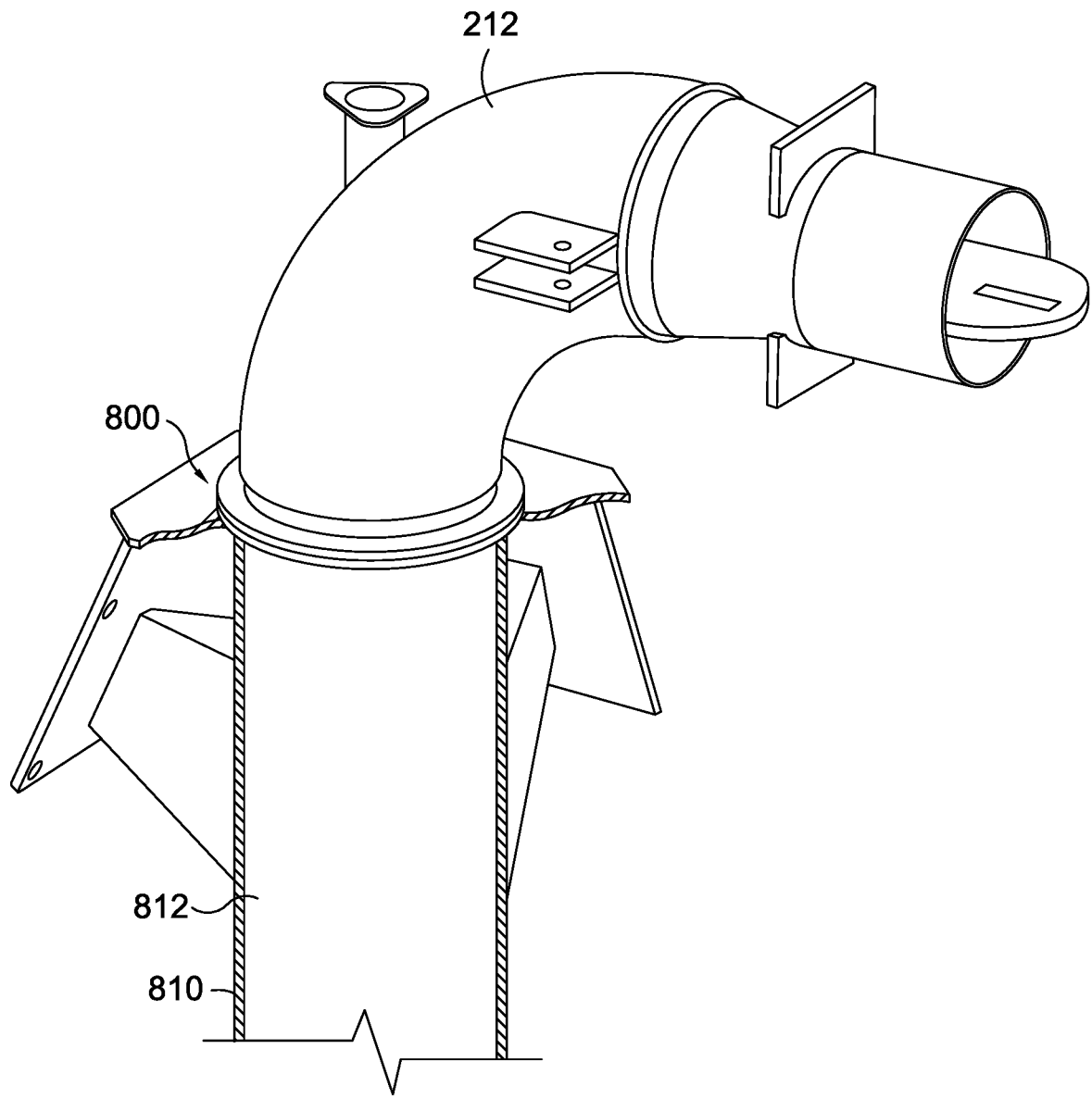
FIG. 8 is a fragmentary, perspective view of a greaseless swivel and bearing assembly in accordance with a second embodiment of the present invention, with portions thereof cut away for clarity.
Figure 9:
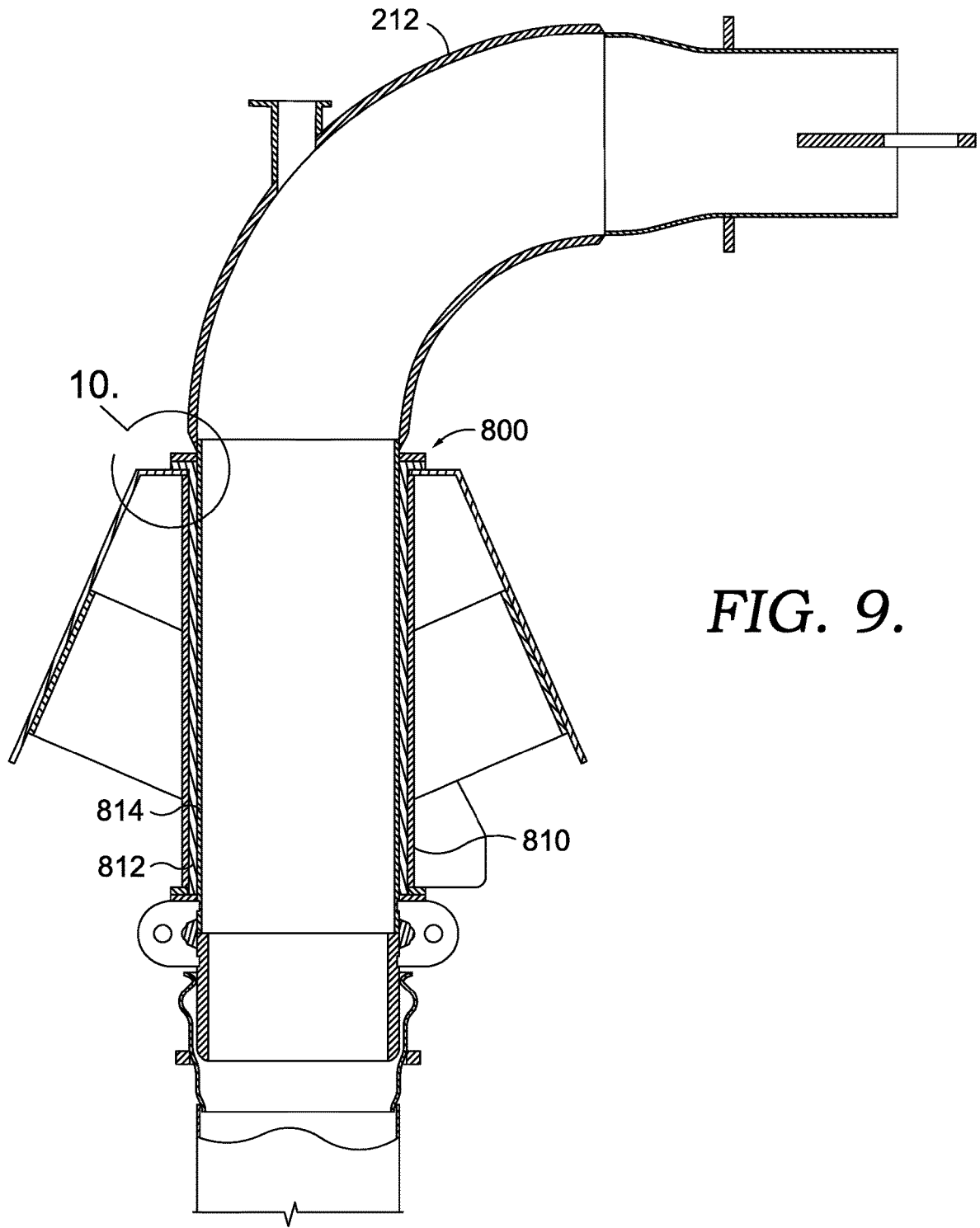
FIG. 9 is a side elevation view in cross-section of the greaseless swivel and bearing assembly of FIG. 8.
Figure 10:
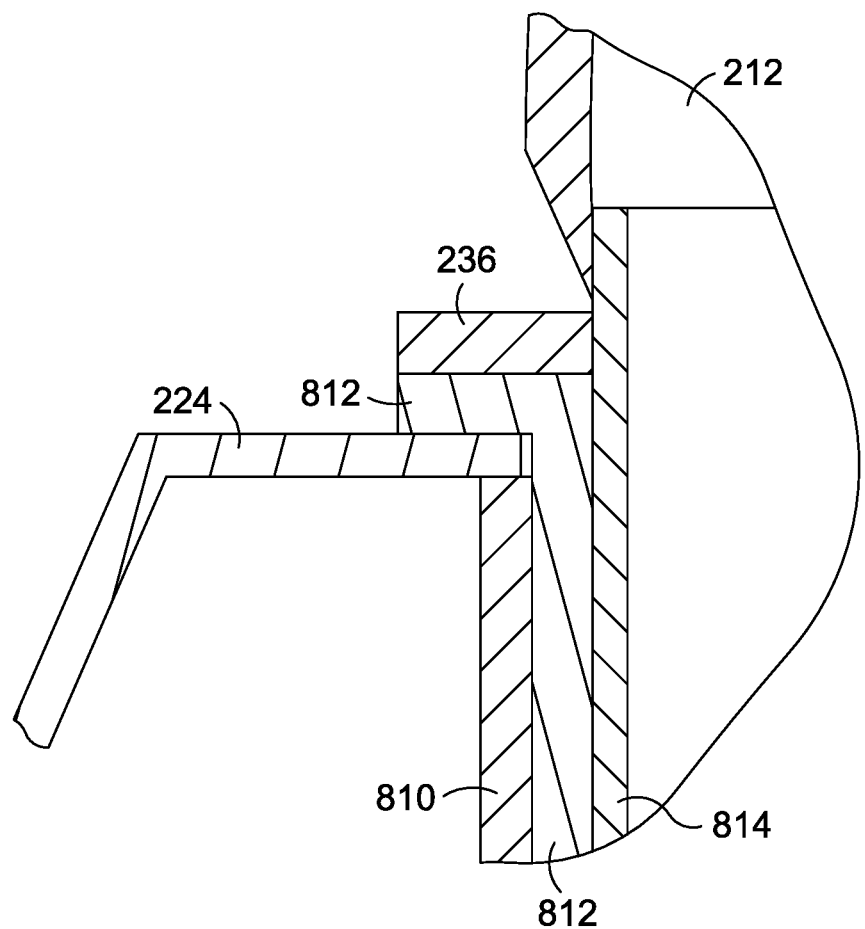
FIG. 10 is an enlarged view of the greaseless swivel and bearing assembly of FIG. 9, taken at line 10 thereof.

Another exemplary embodiment of a greaseless swivel and bearing assembly 800 is illustrated in FIGS. 8-10. This embodiment differs from the embodiment described above in that instead of multiple bushing blocks 246 cooperating to encircle the cylindrical inner tube 212 and collectively provide a bearing surface a single, unitary bushing is provided to accomplish the same thing. The illustrated embodiment includes a substantially cylindrical outer housing 810, a substantially cylindrical bearing sleeve 812, and a substantially cylindrical inner tube 814. Each of the outer housing 810, the bearing sleeve 812, and the inner tube 814 has a substantially circular cross-section. The outer housing 810 has an inner diameter that is larger than an outer diameter of the cylindrical bearing sleeve 812. The cylindrical bearing sleeve 812, in turn, has an inner diameter that is larger than an outer diameter of the cylindrical inner tube 814. Suitable materials for the cylindrical bearing sleeve 812 include low-friction materials such as plastics and/or composites, for instance, NYLATRON or Ultra-High-Molecular-Weight (UHMW) polyethylene. The inner diameter of the outer housing 810 is of a suitable structural material such as galvanized steel, aluminum, or the like.

The outer surface of the substantially cylindrical bearing sleeve 812 movably contacts the inner surface of the cylindrical outer housing 810 and the inner surface of the substantially cylindrical bearing sleeve 812 movably contacts the outer surface of the cylindrical inner tube 814. As with the prior described embodiments, such an arrangement permits rotational movement of the cylindrical inner tube 814 without the need for grease or other lubricants that can damage portions of the assembly 800, cause a mess, and necessitate regular maintenance.

Center pivot irrigation systems generally include a plurality of spans connected end to end. The more spans used, the larger the radius of the circle irrigated by the irrigation system. Some center pivot irrigation systems are provided with final span that is designed to pivot with respect to the plurality of connected main spans. This final span is called a swing arm span. The final tower of the swing arm span is steerable to allow the swing arm span to swing out and back with respect to the main span to permit it to water into corners of a square field. Steerable towers for swing arm spans are known in the art. A more detailed discussion of a swing arm spans is provided in U.S. Patent Application Publication No. 2020/0315109, which is incorporated herein by reference.

Figure 11:
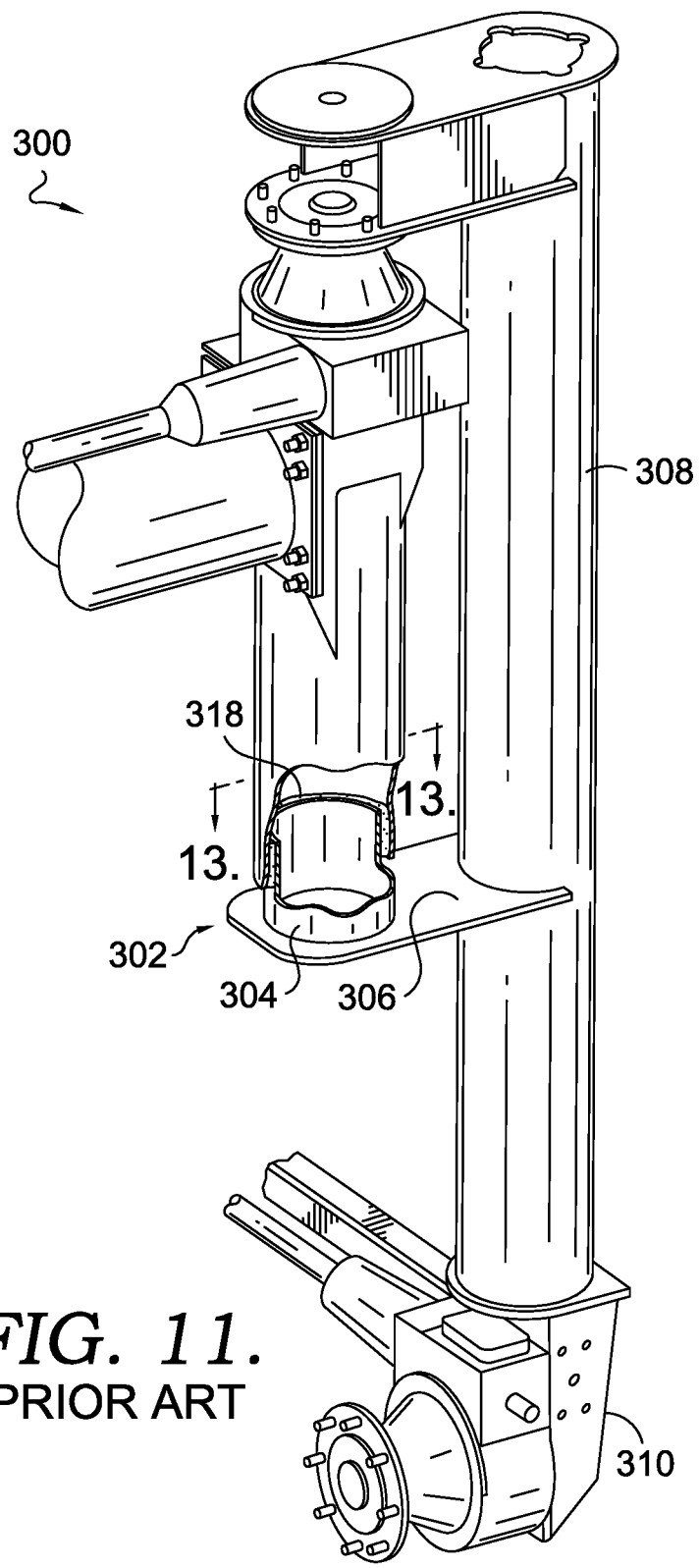
FIG. 11 is a fragmentary perspective view of a prior art swing arm swivel and bearing device that utilizes a lubricant during operation with a portion thereof cut away for clarity.

Turning now to FIG. 11, a perspective view of a prior art swing arm swivel 300 having a bearing steering assembly 302 is depicted. The bearing steering assembly 302 generally comprises a bearing block 304 which is mounted to a bearing steering tube plate 306. Further, the swing arm swivel comprises a steering tube 308, a drive gear plate 310, and an upper plate assembly 312 (FIG. 12). As depicted in FIG. 12, the upper plate assembly 312 generally comprises a top plate 313 and a bottom plate 314, for connection to a steering gearbox 315 for rotating the steering tube 308.

Figure 14:
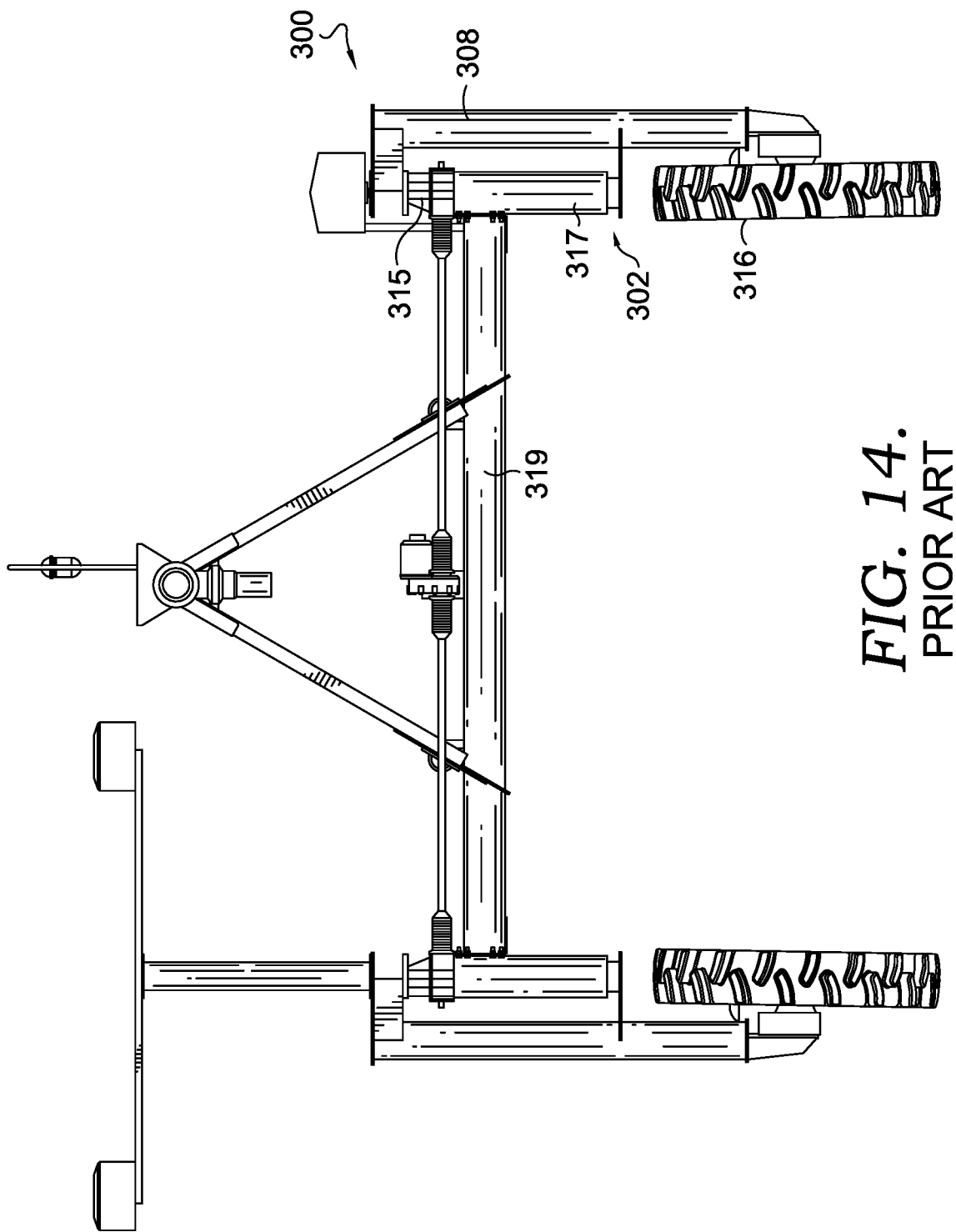
FIG. 14 is a side elevation view of a steerable motorized tower assembly having a steering tube assembly with the prior art swing arm swivel and bearing device of FIG. 11.

The prior art swing arm swivel 300 generally couples, via the steering gearbox 315, to a stationary vertical tube portion 317 coupled to a horizontal cross-member 319, as depicted in FIG. 14. Further, as depicted in FIG. 14, the prior art swing arm swivel 300 is typically coupled to at least one steerable wheel 316, which allows the prior art swing arm swivel 300 to be steered into a corner of an area to be irrigated. In doing so, the prior art swing arm swivel 300 utilizes the vertical water supply column 110 to provide irrigation to a pre-determined area of crops outside of the circular area covered by the pivoting main span. In other words, the swing arm span (not depicted in FIGS. 11-14) is equipped with sprinklers that distribute water to crops and is driven by utilizing the prior art swing arm swivel 300. In doing so, the at least one wheel 316, and by extension, the entirety of the prior art swing arm swivel 300 moves around outside the arc defined by the main span of the irrigation pipeline.

FIG. 12 is a fragmentary side elevation view of a portion of a prior art swing arm swivel 300 and bearing steering assembly 302. Generally, this figure provides an additional view of the prior art swing arm swivel 300. As discussed herein, the prior art swing arm swivel 300 utilized a lubricant 318 (e.g., grease) provided on an exterior surface of the bearing block 304, to reduce friction between an interior surface of the stationary vertical tube portion 317 and the bearing block 304. This lubricant 318 is depicted in FIG. 11 both on the exterior surface of the bearing block 304 and the interior surface of the stationary vertical tube portion 317. The lubricant 318 is also depicted in FIG. 13 as the space between the outer surface of the bearing block 304 and the inner surface of the stationary vertical tube portion 317.

Figure 15:
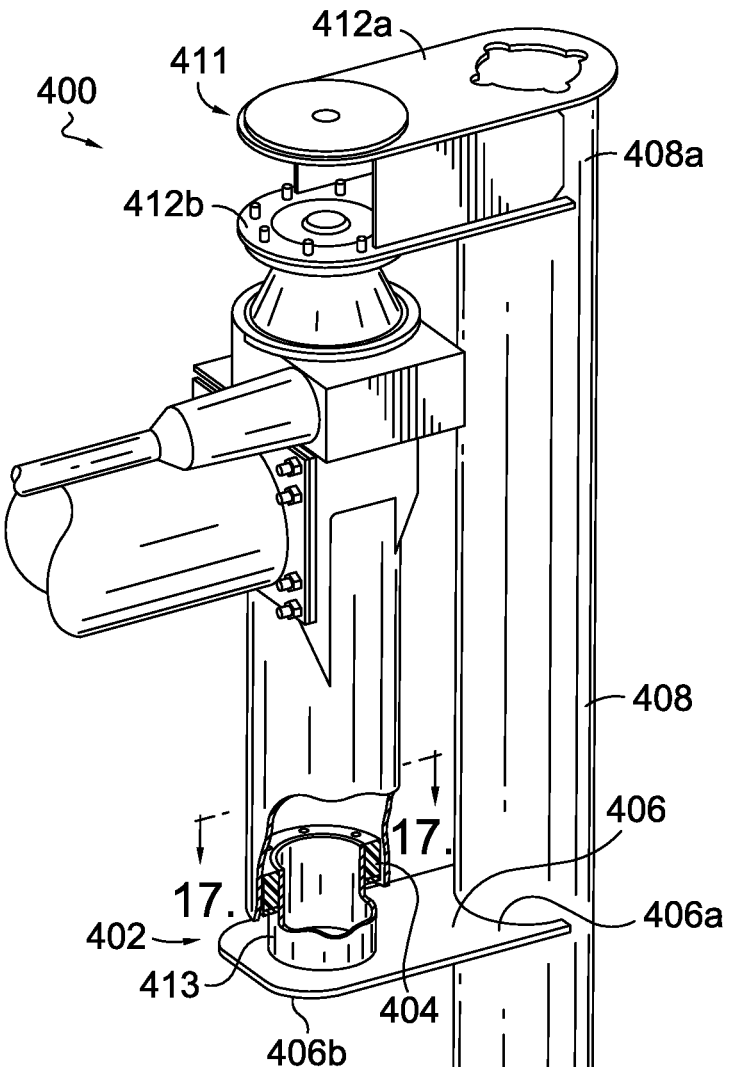
FIG. 15 is a fragmentary perspective view of a novel steering tube assembly with a portion thereof cut away for clarity, in accordance with an embodiment of the present invention.

Turning now to FIG. 15, a perspective view of a novel steering tube assembly 400 having a bearing steering assembly 402 is depicted. As described herein, the bearing steering assembly 402 generally comprises a bearing block 404 positioned on a bearing support 413 that is mounted to a bearing steering tube plate 406. Further, the steering tube assembly 400 comprises a steering tube 408 having a first end 408*a* and a second end 408*b*, a drive gear plate 410, and an upper plate assembly 411. The upper plate assembly 411 is coupled to the first end 408*a* of the steering tube 408 and generally comprises a top plate 412*a* and a bottom plate 412*b*. The bottom plate 412*b* is connected to the steering gearbox 315, which rotates the steering tube assembly 400 with respect to the horizontal cross-member 319 to steer the swing arm span.

In accordance with aspects herein, the drive gear plate 410 is generally described as being coupled to the second end 408*b* of the steering tube 408. Additionally, the steering tube 408 further comprises a bearing steering tube plate 406 that is coupled to the steering tube 408 at a location between the first end 408*a* and the second end 408*b*. The bearing steering tube plate 406 itself comprises a first surface 406*a* and a second surface 406*b*. Broadly, the first surface 406*a* of the bearing steering tube plate 406 includes the bearing support 413 that is coupled directly to the first surface 406*a*. In accordance with aspects herein, the bearing support 413 comprises a cylindrical portion 414, and a flange portion 416 (best seen in FIG. 18), wherein the flange portion has a diameter. Finally, the bearing block 404 is coupled, either directly or indirectly, to the bearing support 413 and the flange portion 416. Generally, the bearing block 404 comprises a cylindrical shape having an inner diameter and an outer diameter, as best illustrated in FIG. 17.

Examples of directly coupling the bearing block 404 to the bearing support 413 would be through the use fasteners, screws, bolts, chemical bonding or direct molding. Alternative, indirect coupling of the bearing block 404 to the bearing support 413 would be through placement of the bearing block 404 directly on top of the bearing support 413, and letting alignment grooves or notches serve as coupling mechanisms. For example, the bearing block 404 may include a single notch (or multiple notches) that mate with the alternative notch (male-to-female, or female-to-male) that may be present upon the bearing support 413. In accordance with some aspects herein, the bearing block is described as being coupled to, or in contact with, the flange portion 416 of the bearing support 413. Moreover, the outer diameter of the bearing block 404 may be sized to match the outer diameter of the flange portion 416. However, other aspects are contemplated, such as aspects in which the outer diameter of the bearing block 404 is larger than the outer diameter of the flange portion 416, or such that the outer diameter of the bearing block is smaller than the outer diameter of the flange portion 416. The inner diameter of the bearing block 404 is generally slightly larger than the outer diameter of the cylindrical portion 414 of the bearing support 413 such that the bearing block fits around the cylindrical portion 414. Likewise, the outer diameter of the bearing support 413 and the inner diameter of the bearing block 404 may also comprise notches, flanges, or other mechanisms to ensure a concentric mating between the bearing support 413 and the bearing block 404.

In accordance with aspects herein, and as discussed previously, the bearing block 404 is preferably manufactured from a low-friction, non-metallic material, in order to reduce or completely eliminate the use of a lubricant. For example, the prior art swing arm swivel 300 (FIGS. 11-14) generally relied upon the lubricant 318 to reduce friction between the exterior surface of the bearing block 304 and the interior surface of the stationary vertical tube portion 317 as the swing arm swivel 300 was rotated to steer the swing arm span. In some aspects herein, the lubricant 318 may be referred to as "grease". However, it is a goal of the novel steering tube assembly to provide a maintenance free bearing support 413 and bearing block 404 that does not require the use of any lubricant or grease.

Thus, the bearing block 404 is manufactured using a low-friction, non-metallic material in lieu of manufacturing the aforementioned components using metallic materials. By using a low-friction, non-metallic material as the primary material for manufacturing the bearing block 404, the friction between the interior surface of the stationary vertical tube portion 317 and the exterior surface of the bearing block 404 is greatly reduced. Thus, the reduction in friction between these components results in an assembly that does not require any lubricant or grease. Further, by not requiring any lubricant or grease, this greatly reduces the amount of maintenance time that a user or owner of the novel steering tube assembly 400 will have to spend working with the novel steering tube assembly 400.

In accordance with aspects herein, the low-friction, non-metallic material may be a plastic or a composite. In other aspects, the low-friction, non-metallic material is Ultra-High-Molecular-Weight (UHMW) polyethylene. Additionally, when discussing that the bearing block 404 may be manufactured using a low-friction, non-metallic material, it is also contemplated that the bearing block 404 may be partially or fully manufacturing using the low-friction, non-metallic material. For example, the bearing block 404 may comprise anywhere from 25% to 100% low-friction, non-metallic material. The exact percentage of low-friction, non-metallic material may be determined through experimentation.

In accordance with aspects depicted in FIGS. 15-18, the combination of the bearing steering tube plate 406, the bearing support 413, and the bearing block 404 may be referred to herein as the "bearing block assembly". While FIGS. 15-18 depict the bearing block assembly as being coupled to the steering tube 408 at a location midway between the first end 408a of the steering tube 408 and the second end 408b of the steering tube 408, it is contemplated herein that the exact location of coupling may occur at any location along the length of the steering tube 408. The concept of the bearing block assembly being coupled to the steering tube 408 at a location midway between the first end 408a of the steering tube 408 and the second end 408b of the steering tube 408 is best depicted in FIG. 16. In accordance with aspects herein, FIG. 16 depicts a side elevation view of the novel steering tube assembly 400.

Moreover, the bearing block assembly does not necessarily have to be coupled to a steering tube. In other words, there are a number of applications in which the bearing block assembly may be coupled to something other than a steering tube, such a component of an irrigation system. It is thus understood that the bearing block assembly is not limited to only the applications depicted in this Application, but instead is rather flexible in the aspect in which the bearing block assembly may be coupled to an irrigation system.

As discussed above, the bearing block assembly generally utilizes a low-friction, non-metallic material, such that coupling the bearing block assembly to another component of an irrigation system may be done to remove the use of a lubricant. Further, and as previously discussed herein, the low-friction, non-metallic material used to manufacture the bearing block assembly may generally be a plastic or a composite material. More specifically, the plastic may be an Ultra-High-Molecular-Weight (UHMW) polyethylene, however other types of material are considered to be within the scope of this application.

Moreover, and as discussed previously herein, the bearing block 404 is generally considered to be in contact with the flange portion 416 of the bearing support 413. In some aspects, the bearing block 404 may merely be in contact with the flange portion 416, and in other aspects, the bearing block 404 may be coupled directly to the flange portion 416 through the use of fasteners, bolts, screws, chemical bonding, or other methods.

Figure 18:
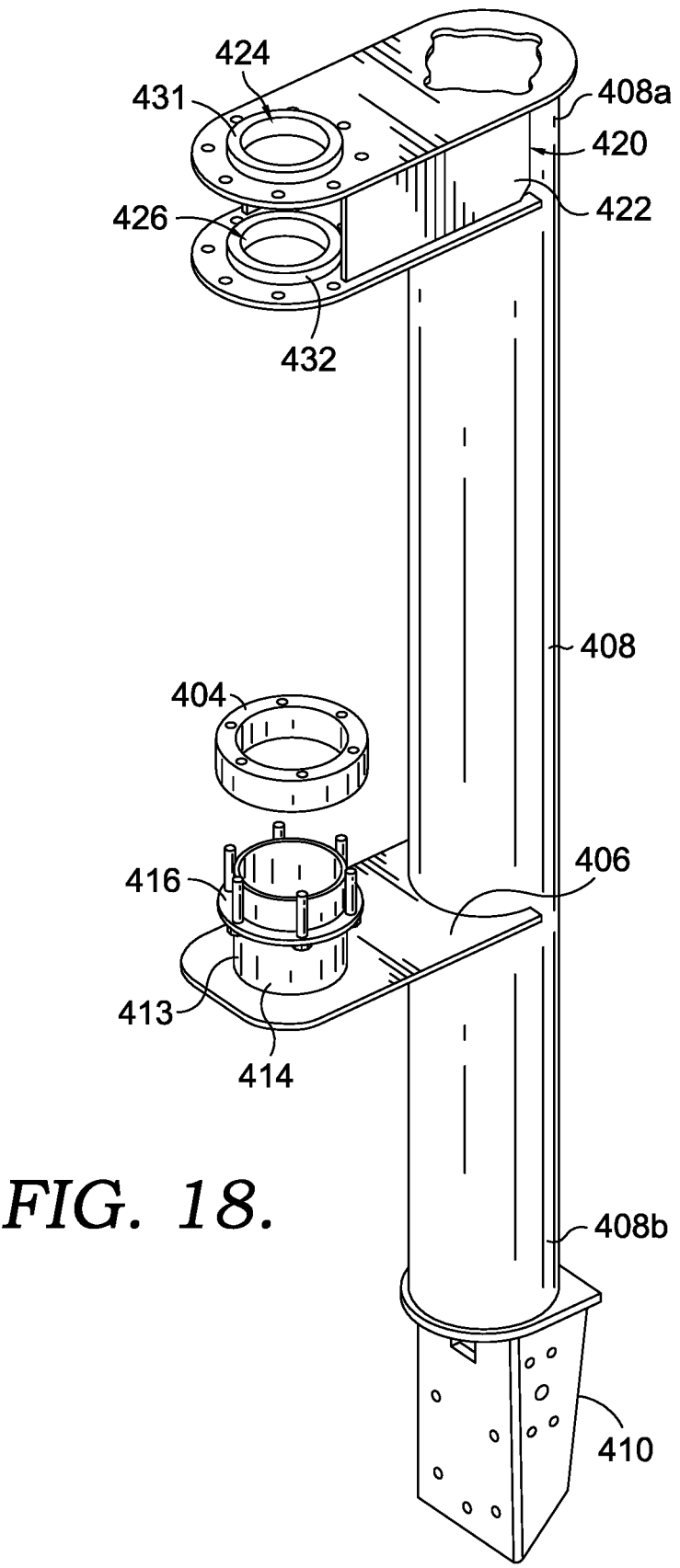
FIG. 18 is a partially exploded perspective view of the novel steering tube assembly of FIG. 15.

Turning now to FIG. 18, an exploded perspective view of the novel steering tube assembly 400 is depicted, in accordance with aspects herein. As depicted in FIG. 18, the bearing block 404 is depicted as "exploded" (i.e., un-coupled) from the flange portion 416 of the bearing support 413. In FIG. 18, the bearing block 404 is depicted as being coupleable to the flange portion 416 of the bearing support 413 by way of bolts mounted to the flange portion 416. However, and as discussed previously, the depiction of bolts in FIG. 18 is merely exemplary, as other methods of coupling such as fasteners, screws, chemical bonding, notches, and other methods are contemplated as being within the scope of this disclosure.

In FIG. 18, the novel steering tube assembly 400 is depicted as having the steering tube 408 with the first end 408a, the second end 408b, the upper plate assembly 411 coupled to the first end 408a of the steering tube 408, the drive gear plate 410 coupled to the second end 408b of the steering tube, and the bearing steering tube plate 406 coupled to the steering tube 408 at a location between the first end 408a and the second end 408b of the steering tube 408. The bearing steering tube plate 406 has the first surface 406a and the second surface 406b. Moreover, FIG. 18 includes an outer housing 420 having a sidewall 422 having a top portion 422a and a bottom portion 422b (FIG. 16). The novel steering tube assembly 400 includes the top plate 412a which is coupled with the top portion 422a of the sidewall 422, and the top plate 412a has a first opening 424 therein.

Additionally, the novel steering tube assembly 400 further includes the bottom plate 412b coupled with the bottom portion 422b of the sidewall 422, wherein the bottom plate 412b has a second opening 426 therein. The upper plate assembly 411 includes a first bushing member 431 adjacent the top plate 412a and a second bushing member 432 adjacent the bottom plate 412b.

As discussed previously with respect to FIGS. 15-17, FIG. 18 depicts that the bearing block 404 is a cylindrical shape having an inner diameter and an outer diameter. In accordance with aspects herein, the outer diameter of the bearing block 404 is sized to be received in the inner diameter of the stationary vertical tube portion 317.

Aspects of the disclosure have been described to be illustrative rather than restrictive. It will be understood that certain features and sub-combinations are of utility and may be employed without reference to other features and subcombinations. This is contemplated by and is within the scope of the claims.

What is claimed is:

1. A steering tube assembly comprising:
    a steering tube having a first end and a second end;
    an upper plate assembly coupled to the first end of the steering tube, the upper plate assembly having:
        a top plate having a first opening therein; and
        a bottom plate having a second opening therein;
    a drive gear plate coupled to the second end of the steering tube;
    a bearing steering tube plate coupled to the steering tube at a location between the first end and the second end of the steering tube, the bearing steering tube plate having a first surface and a second surface;
    a bearing support coupled to the first surface of the bearing steering tube plate, wherein the bearing support comprises a cylindrical portion and a flange portion having a diameter; and
    a bearing block coupled to the bearing support, wherein the bearing block comprises a low-friction, non-metallic material.

2. The steering tube assembly of claim 1, wherein the bearing block is a cylindrical shape having an inner diameter and an outer diameter.

3. The steering tube assembly of claim 2, wherein the bottom plate comprises a bushing member.

4. The steering tube assembly of claim 2, wherein the flange portion of the bearing support comprises a plurality of fasteners positioned radially around the flange portion.

5. The steering tube assembly of claim 2, wherein the cylindrical portion of the bearing support comprises an outer diameter and wherein the bearing block comprises an inner diameter sized to receive the outer diameter of the cylindrical portion of the bearing support.

6. The steering tube assembly of claim 1, wherein the low-friction, non-metallic material is a plastic or a composite.

7. The steering tube assembly of claim 6, wherein the plastic is Ultra-High-Molecular-Weight (UHMW) polyethylene.

8. A bearing block assembly, comprising:
    a bearing steering tube plate having a first surface and an opposing second surface;
    a bearing support coupled to the first surface of the bearing steering tube plate, the bearing support comprising:
        a cylindrical portion having an outer diameter; and
        a flange portion coupled to the cylindrical portion of the bearing support, the flange portion having an internal diameter generally equal to the outer diameter of the cylindrical portion, an outer diameter larger than the internal diameter of the flange portion, and a thickness;
    a top plate having a first opening therein;
    a bottom plate having a second opening therein; and
    a bearing block having an internal diameter generally equal to the outer diameter of the cylindrical portion, wherein the bearing block is received on the cylindrical portion and comprises a low-friction, non-metallic material.

9. The bearing block assembly of claim 8, wherein the low-friction, non-metallic material is a plastic or a composite.

10. The bearing block assembly of claim 9, wherein the plastic is Ultra-High-Molecular-Weight (UHMW) polyethylene.

11. The bearing block assembly of claim 8, wherein the bottom plate comprises a bushing member.

12. The bearing block assembly of claim 8, wherein the flange portion of the bearing support comprises a plurality of fasteners positioned radially around the flange portion.

13. A swivel and bearing assembly, comprising:
    a steering tube having a first end and a second end;
    an upper plate assembly coupled to the first end of the steering tube, the upper plate assembly having:
        an outer housing having a sidewall having a top portion and a bottom portion;
        a top plate coupled with the top portion of the sidewall, the top plate having a first opening therein; and
        a bottom plate coupled with the bottom portion of the sidewall, the bottom plate having a second opening therein;
    a drive gear plate coupled to the second end of the steering tube;
    a bearing steering tube plate coupled to the steering tube at a location between the first end and the second end of the steering tube, the bearing steering tube plate having a first surface and a second surface;
    a bearing support coupled to the first surface of the bearing steering tube plate, wherein the bearing support comprises a cylindrical portion and a flange portion having a diameter; and
    a bearing block coupled to the bearing support, wherein the bearing block comprises a low-friction, non-metallic material.

14. The swivel and bearing assembly of claim 13, wherein the upper plate assembly further comprises:
    a first plurality of bushing members positioned adjacent the top plate, and circumferentially about the first opening; and
    a second plurality of bushing members positioned adjacent the bottom plate, and circumferentially about the second opening.

15. The swivel and bearing assembly of claim 14, wherein the bearing block is a cylindrical shape having an inner diameter and an outer diameter and wherein the bearing block is in contact with the flange portion of the bearing support.

16. The swivel and bearing assembly of claim 14, wherein the outer diameter of the bearing block is sized to match the diameter of the flange portion of the bearing support.

17. The swivel and bearing assembly of claim 14, wherein the bearing support further comprises an outer diameter of the cylindrical portion, and the bearing block further comprises an inner diameter sized to mate with the outer diameter of the cylindrical portion.

18. The swivel and bearing assembly of claim 14, wherein the low-friction, non-metallic material is a plastic or a composite.

19. The swivel and bearing assembly of claim 18, wherein the plastic is Ultra-High-Molecular-Weight (UHMW) polyethylene.

20. The swivel and bearing assembly of claim 18, wherein the low-friction, non-metallic material acts as an alternative to lubricant coatings on the bearing block.

* * * * *

UNITED STATES PATENT AND TRADEMARK OFFICE
CERTIFICATE OF CORRECTION

| | |
|---|---|
| PATENT NO. | : 12,037,067 B2 |
| APPLICATION NO. | : 17/238061 |
| DATED | : July 16, 2024 |
| INVENTOR(S) | : Brennan Joos Ziegelmeier and Mark Randall Virus |

It is certified that error appears in the above-identified patent and that said Letters Patent is hereby corrected as shown below:

On the Title Page
At item (73), Assignee, change, "Reinke Manufacturing Co., Deshler, NE (US)" to -- Reinke Manufacturing Co., Inc., Deshler, NE (US) Inc. --

Signed and Sealed this
Third Day of September, 2024

Katherine Kelly Vidal
Director of the United States Patent and Trademark Office